US012058508B2

(12) United States Patent
Afshar

(10) Patent No.: US 12,058,508 B2
(45) **Date of Patent: *Aug. 6, 2024**

(54) SYSTEM AND METHODS FOR IMPROVED ACOUSTO-HAPTIC SPEAKERS

(71) Applicant: IMMERZ, INC., Cambridge, MA (US)

(72) Inventor: Shahriar S. Afshar, Encino, CA (US)

(73) Assignee: IMMERZ, INC., Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/169,066

(22) Filed: Feb. 14, 2023

(65) Prior Publication Data

US 2023/0379632 A1 Nov. 23, 2023

Related U.S. Application Data

(63) Continuation of application No. 17/228,546, filed on Apr. 12, 2021, now Pat. No. 11,611,832, which is a (Continued)

(51) Int. Cl.

*H04R 9/06* (2006.01)
*H04R 1/22* (2006.01)
*H04R 1/28* (2006.01)
*H04R 3/14* (2006.01)
*H04R 5/033* (2006.01)

(Continued)

(52) U.S. Cl.

CPC ................ *H04R 9/06* (2013.01); *H04R 1/22* (2013.01); *H04R 1/2811* (2013.01); *H04R 3/14* (2013.01); *H04R 5/04* (2013.01); *H04R 31/00* (2013.01); *H04R 5/033* (2013.01); *H04R 9/043* (2013.01);

(Continued)

(58) Field of Classification Search

CPC ........... H04R 2400/03; H04R 2460/13; H04R 1/1008; H04R 1/1075; H04R 9/066; H04R 2499/11; H04R 1/1091; H04R 9/18; H04R 1/00; H04R 1/1066; H04R 1/46; H04R 9/06; H04R 17/10; H04R 1/1016;

(Continued)

(56) References Cited

U.S. PATENT DOCUMENTS 4,131,180 A * 12/1978 Maeda .................. G10K 13/00
181/166
5,125,031 A * 6/1992 Ledonne ................. H04R 1/02
181/161

(Continued)

FOREIGN PATENT DOCUMENTS

| | | | |
|---|---|---|---|
| KR | 950011496 B1 * | 10/1995 | ......... A61H 23/0236 |
| KR | 100612217 B1 * | 8/2006 | ........... H04R 31/006 |
| KR | 20080048377 A * | 6/2008 | ............... H04R 9/63 |

*Primary Examiner* — Oyesola C Ojo
(74) *Attorney, Agent, or Firm* — Foley & Lardner LLP

(57) ABSTRACT

The systems and methods described herein relate to, among other things, a transducer capable of producing acoustic and tactile stimulation. The transducer includes a rigid mass element disposed on the diaphragm of a speaker. The mass element may optionally be removable and may have a mass selected such that the resonant frequency of the transducer falls within the range of frequencies present in an input electrical audio signal. The systems and methods advantageously benefits from both the fidelity and audio performance of a full-range speaker while simultaneously producing high-fidelity, adjustable and palpable haptic vibrations.

20 Claims, 11 Drawing Sheets

Related U.S. Application Data continuation of application No. 16/214,360, filed on Dec. 10, 2018, now Pat. No. 10,979,817, which is a continuation of application No. 15/425,799, filed on Feb. 6, 2017, now Pat. No. 10,154,348, which is a continuation of application No. 13/646,218, filed on Oct. 5, 2012, now abandoned.

(60) Provisional application No. 61/743,516, filed on Sep. 5, 2012, provisional application No. 61/626,891, filed on Oct. 5, 2011.

(51) Int. Cl.

| | |
|---|---|
| ***H04R 5/04*** | (2006.01) |
| ***H04R 9/04*** | (2006.01) |
| ***H04R 31/00*** | (2006.01) |

(52) U.S. Cl.

CPC ...... *H04R 2400/03* (2013.01); *H04S 2400/07* (2013.01); *Y10T 29/4908* (2015.01)

(58) Field of Classification Search

CPC ..... A61B 7/04; A61B 2562/0204; A61B 7/02; Y10T 29/49005; Y10T 29/4908; B06B 1/045

See application file for complete search history.

(56) References Cited

U.S. PATENT DOCUMENTS

| | | | | | |
|---|---|---|---|---|---|
| 5,388,992 | A * | 2/1995 | Franklin | G09B 21/003 | 340/407.1 |
| 5,528,697 | A * | 6/1996 | Saito | B06B 1/045 | 340/407.1 |
| 7,421,088 | B2 * | 9/2008 | Cranfill | H04M 1/03 | 381/396 |
| 8,520,866 | B2 * | 8/2013 | Linjama | H04M 1/03 | 381/174 |
| 2001/0017922 | A1 * | 8/2001 | Kim | H04R 9/06 | 381/430 |
| 2002/0037089 | A1 * | 3/2002 | Usuki | H04R 13/02 | 381/396 |
| 2003/0044031 | A1 * | 3/2003 | Son | H04R 15/00 | 381/372 |
| 2007/0217644 | A1 * | 9/2007 | LeDonne | H04R 5/023 | 381/396 |
| 2009/0180646 | A1 * | 7/2009 | Vulfson | H04R 1/02 | 381/151 |
| 2010/0246861 | A1 * | 9/2010 | Han | H04R 1/1016 | 381/151 |
| 2010/0296691 | A1 * | 11/2010 | Komatsu | H04R 7/26 | 381/413 |
| 2011/0211722 | A1 * | 9/2011 | Bank | H04R 7/10 | 381/369 |
| 2012/0062491 | A1 * | 3/2012 | Coni | G06F 3/03547 | 345/173 |
| 2013/0194082 | A1 * | 8/2013 | Polyakov | G06F 3/01 | 340/384.5 |

* cited by examiner

SYSTEM AND METHODS FOR IMPROVED ACOUSTO-HAPTIC SPEAKERS

CROSS-REFERENCE TO RELATED APPLICATIONS

This application is a continuation of U.S. patent application Ser. No. 17/228,546, filed on Apr. 12, 2021, which is a continuation of U.S. patent application Ser. No. 16/214,360, filed on Dec. 10, 2018, which is a continuation of U.S. patent application Ser. No. 15/425,799, filed on Feb. 6, 2017, which is a continuation of U.S. patent application Ser. No. 13/646,218, filed Oct. 5, 2012, which claims the benefit of priority of U.S. Provisional Application No. 61/743,516, filed on Sep. 5, 2012, and U.S. Provisional Application No. 61/626,891, filed Oct. 5, 2011. The content of the foregoing applications is incorporated herein in its entirety by reference.

FIELD OF THE INVENTION

The systems and methods described herein relates in general to acoustic and tactile transducer systems, and methods for driving the same.

BACKGROUND

Today there is an increasing need to supplement multimedia systems that present audio and visual data to a user, with additional sensory stimuli. Multimedia systems such as televisions, portable devices, and video games are being enhanced through the introduction of improved screens and network capabilities. In addition to these more traditional areas of improving user experience, another area of consideration is tactile stimulation. In combination with improved audio and visual effects, tactile stimulation can make a game or movie experience much more realistic and memorable.

Currently, there exists devices such as piezo-electric transducers that are capable of specifically providing tactile stimulation. These devices have to be controlled by a driver that is separate from the driver used to control audio or visual output. Thus, not only are they separate from audio speakers, they also require additional components for synchronized operation with the rest of the multimedia system.

There are several other types of devices such as bass shakers and multifunction transducers that provide palpable vibrations while also processing audio signals and generating sound. The bass shaker converts the bass component of an electric audio input into vibrations. Bass shakers are driven by a very low frequency signal that causes the device to resonate and thereby generate these palpable vibrations. However, these bass shakers have poor damping characteristics, resulting in lingering vibrations even after the audio/visual data has ended.

Another device that has gained some popularity in providing both audio and tactile stimulation is a multifunction transducer (MET). MFTs comprise a speaker cone connected to a voice coil, and a magnetic assembly that provides a magnetic field in which the coil operates. Unlike regular speakers, both the voice coil and the magnetic assembly are resiliently mounted and capable of oscillating. The magnetic assembly and the speaker cone can be driven to oscillate by applying signals to the voice coil. The magnetic assembly owing to its mass and compliance of its mounting will oscillate at a relatively low frequency within the range of frequencies that are easily perceptible to a user. Although. MFT's provide both audio and tactile stimulation, their resonant frequencies are predetermined and difficult to modify without completely disassembling them.

Accordingly, a need exists for systems and methods that improve the user's interaction with the content being presented. It is desirable that the system does not distract from the content being presented. It is also desirable that the system be easy to use, portable, inexpensive, and suitable for long term use.

SUMMARY

As noted above there exists systems for providing both audio and tactile stimulations. However, these existing systems cannot mimic the fidelity and audio performance of a full-range speaker while simultaneously producing high-fidelity and adjustable vibrations. The systems and methods described herein provide for such an acoustic and tactile transducer. In particular, the acousto-haptic transducer described herein may comprise a mass element disposed on the diaphragm of a speaker such as a full-range speaker. The mass element may optionally be removable and may have a mass selected such that the resonant frequency of the transducer falls within the range of frequencies present in an input electrical audio signal. The mass element may be attached to the diaphragm via a holder. The holder and the mass element may also be configured so as to avoid contact with the center region of the diaphragm and allow for sound to pass through from the center of the speaker. The acousto-haptic transducer may comprise an echo chamber formed near the diaphragm for enhancing and/or amplifying the haptic signal. The echo chamber may be formed in the region enclosing the diaphragm and an additional semi rigid diaphragm attached to the voice coil. The acousto-haptic transducer may comprise a rotation assembly for allowing the transducer to rotate and move or pivot freely when placed on the user. Such a rotation assembly may include a ball and socket mechanism. The system may further comprise a controller for splitting an electrical audio signal into a high and low frequency portion and amplifying the low frequency portion. During operation, the amplified low frequency portion of the input audio signal may overlap with the resonant frequency of the transducer and cause it to vibrate while being damped by the full-range speaker's spider.

In particular, in one aspect, the systems and methods described herein include a transducer capable of generating acoustic and haptic signals. The transducer may comprise a speaker, including a diaphragm, configured to transform an electrical signal having audio information in a first range of frequencies, into an acoustic signal. The transducer may further comprise a mass element attached to the center region of the diaphragm and an echo chamber formed adjacent to the diaphragm. In certain embodiments, the mass of the mass element is selected such that a portion of a resonant frequency range of the combination of the speaker and the mass element falls within the first range of frequencies. The resonant frequency range may be from 50 to 4000 Hz. The mass element may be removably attached to the diaphragm. In certain embodiments, the mass element is glued to the center region of the diaphragm.

The mass element may be formed from a rigid material having a mass in the range of about 1 g to 4 g. The mass element may be formed from copper and may optionally be disk-shaped. In certain embodiments, the ratio of surface area of the top surface of the diaphragm to the surface area of the top surface of the mass element is about 4:1. The transducer may further include a holder attached to the diaphragm for holding the mass element. In certain embodiments, the transducer includes a plurality of mass elements removably stacked on top of each other.

The transducer, and more particularly the speaker may further include a voice coil attached to a diaphragm for receiving the electrical signal and moving the diaphragm in response to the electrical signal, and a spider attached to the voice coil for damping oscillations of the voice coil, the diaphragm and the mass element. In certain embodiments, the diaphragm is substantially rigid and the speaker further comprises a semi-rigid diaphragm. The semi-rigid diaphragm may be attached to the voice coil and the rigid diaphragm, such that the echo chamber is formed in the region enclosed by the semi-rigid diaphragm and the rigid diaphragm. The rigid diaphragm may be cone-shaped and the semi-rigid diaphragm may be substantially hemispherical shaped.

The speaker may be a full-range speaker. In certain embodiments, the transducer may include a housing having a cap such that the speaker and mass element are disposed within the housing. In such embodiments, the diaphragm is capable of moving up to a maximum height within the housing, and wherein the mass element has a height selected such that when the diaphragm has moved up to the maximum height, the mass element is within the housing and below the cap.

In certain embodiments, the transducer includes comprising a controller connected to a source of the electrical signal and the speaker for splitting the electrical signal and driving the speaker and the mass element with at least one of a signal containing information in the audible frequencies, and a signal containing information in the haptic frequencies. In such embodiments, the controller is configured to amplify the signal containing information in the haptic frequencies.

In another aspect, the systems and methods described herein may include a transducer capable of generating acoustic and tactile signals from an electrical signal having audio information. The transducer may comprise a commercially-available speaker, having a voice coil and a diaphragm disposed within a housing, capable of generating an acoustic signals from electrical signals having audio information within a first range of frequencies. The transducer may also comprise a mass element coupled to at least one of the voice coil and the diaphragm, and an echo chamber formed between the diaphragm and the voice coil. The mass element may be selected such that the transducer has a resonant frequency that falls within the first range of frequencies.

In yet another aspect, the systems and methods described herein may include a system of generating acoustic and tactile signals from an electrical signal having audio information. The system may include a transducer, and a controller. The transducer may include a voice coil, a diaphragm, a spider, a mass element and an echo chamber. The voice coil may be configured to receive an output electrical signal having information within an output range of frequencies. The diaphragm and the spider may be coupled to the voice coil. The mass element may be coupled to at least one of the voice coil and the diaphragm, and having a mass selected such that the resonant frequency of the transducer is within the output range of frequencies. The echo chamber may be formed between the diaphragm and the voice coil. In certain embodiments, the controller may comprise a splitter, an amplifier and a switch. The splitter may be configured for receiving an input electrical signal, and splitting the input electrical signal into at least a first portion having a first range of frequencies and a second portion having a second range of frequencies, wherein the resonant frequency is within the second range of frequencies. The amplifier may be configured for amplifying the second portion. The switch may be connected to the splitter and the amplifier, and configured to receive the first portion, the amplified second portion and a combination of the first portion and the amplified second portion.

In yet another aspect, the systems and methods described herein may include a system of generating acoustic and tactile signals from an electrical signal having audio information. The system may include a transducer, and a controller. The transducer may include a voice coil, a diaphragm, a spider, a mass element and a rotation assembly. The voice coil may be configured to receive an output electrical signal having information within a output range of frequencies. The diaphragm and the spider may be coupled to the voice coil. The mass element may be coupled to at least one of the voice coil and the diaphragm, and having a mass selected such that the resonant frequency of the transducer is within the output range of frequencies. The rotation assembly may include ball attached to a portion of the transducer, the ball being configured to fit within the socket. The transducer may be configured to rotate within the socket. In certain embodiments, the controller may comprise a splitter, an amplifier and a switch. The splitter may be configured for receiving an input electrical signal, and splitting the input electrical signal into at least a first portion having a first range of frequencies and a second portion having a second range of frequencies, wherein the resonant frequency is within the second range of frequencies. The amplifier may be configured for amplifying the second portion. The switch may be connected to the splitter and the amplifier, and configured to receive the first portion, the amplified second portion and a combination of the first portion and the amplified second portion.

In still another aspect, the systems and methods described herein may include a method of generating acoustic and tactile signals from an electrical signal having information within a first range of frequencies. The method may comprise providing a transducer having a mass element disposed on a diaphragm of a speaker, wherein, the mass of the mass element is selected such that a portion of a resonant frequency range of the transducer falls within the first range of frequencies. The method may further comprise providing a transducer having an echo chamber formed adjacent the diaphragm. The method further comprises receiving, at the transducer, the electrical signals, and generating, at the transducer, acoustic signals due to the vibration of the diaphragm, and haptic signals due to the resonance of the transducer created by the movement of the mass element at a frequency within the resonant frequency range. The haptic signals may be amplified by the echo chamber. In certain embodiments, the speaker includes a voice coil for receiving the electrical signals, and a spider connected to the voice coil, the method further comprising damping, by the spider, the vibration of the diaphragm and the movement of the mass element.

In another aspect, the systems and methods described herein include a method of manufacturing a transducer capable of generating acoustic and haptic signals from an electrical signal. The method comprises providing an acoustic transducer having a diaphragm, spider and voice coil, and attaching a mass element to the diaphragm. The method further comprises attaching a semi-rigid diaphragm adjacent to the rigid diaphragm to form an echo chamber. In certain embodiments, the mass element includes a rigid metal having a mass selected such that the resonant frequency of the acoustic transducer combined with the mass element falls within a range of frequencies of the electrical signal.

In another aspect, the systems and methods described herein include a method of manufacturing a transducer capable of generating acoustic and haptic signals from an electrical signal. The method comprises providing an acoustic transducer having a diaphragm, spider and voice coil, and attaching a mass element to the diaphragm. The method further comprises attaching a rotation assembly including a socket, and a ball to a portion of the transducer. The ball may be configured to fit within the socket and the transducer may be configured to rotate within the socket. In certain embodiments, the mass element includes a rigid metal having a mass selected such that the resonant frequency of the acoustic transducer combined with the mass element falls within a range of frequencies of the electrical signal.

In another aspect, the systems and methods described herein include a transducer capable of generating acoustic and haptic signals. The transducer may comprise a speaker, including a diaphragm, configured to transform an electrical signal having audio information in a first range of frequencies, into an acoustic signal. The transducer may further comprise a mass element attached to the center region of the diaphragm. The transducer may also include a rotation assembly including a socket, and a ball attached to a portion of the speaker, the ball being configured to fit within the socket. The speaker may be configured to rotate within the socket. In certain embodiments, the mass of the mass element is selected such that a portion of a resonant frequency range of the combination of the speaker and the mass element falls within the first range of frequencies. The resonant frequency range may be from 50 to 4000 Hz. The mass element may be removably attached to the diaphragm. In certain embodiments, the transducer further comprises a sponge block positioned within the socket, such that the ball is positioned on a surface of the sponge block.

In another aspect, the systems and methods described herein include a transducer capable of generating acoustic and haptic signals. The transducer may comprise a speaker, including a diaphragm, configured to transform an electrical signal having audio information in a first range of frequencies, into an acoustic signal. The transducer may comprise a holder attached to a portion of the diaphragm. The holder may include an opening positioned above a center region of the diaphragm. The transducer may further comprise a mass element attached to the holder above the center region of the diaphragm. In certain embodiments, the mass element includes an opening positioned above the opening of the holder, such that at least a portion of the acoustic signal passes from the speaker and through the openings in the mass element and the holder. The transducer may also include a rotation assembly including a socket, and a ball attached to a portion of the speaker, the ball being configured to fit within the socket. The speaker may be configured to rotate within the socket. In certain embodiments, the mass of the mass element is selected such that a portion of a resonant frequency range of the combination of the speaker and the mass element falls within the first range of frequencies. The resonant frequency range may be from 50 to 4000 Hz. The mass element may be removably attached to the diaphragm. In certain embodiments, the transducer further comprises a sponge block positioned within the socket, such that the ball is positioned on a surface of the sponge block.

BRIEF DESCRIPTION OF THE DRAWINGS

The foregoing and other objects and advantages of the invention will be appreciated more fully from the following further description thereof, with reference to the accompanying drawings wherein.

DETAILED DESCRIPTION OF THE ILLUSTRATED EMBODIMENTS

The systems and methods described herein relate to a transducer capable of producing acoustic and tactile stimulation. The transducer includes a mass element disposed on the diaphragm of a speaker. The mass element may optionally be removable and may have a mass selected such that the resonant frequency of the transducer falls within the range of frequencies present in an input electrical audio signal. The mass element may be attached to the diaphragm via a holder. The holder and the mass element may also be configured so as to avoid contact with the center region of the diaphragm and allow for sound to pass through from the center of the speaker. The transducer may include an echo chamber for enhancing the tactile stimulation, and a rotation assembly (e.g., ball and socket mechanism) for improving the fit of the transducer on a user. The systems and methods described herein will now be described with reference to certain illustrative embodiments. However, the present disclosure is not to be limited to these illustrated embodiments which are provided merely for the purpose of describing the systems and methods described herein and are not to be understood as limiting in anyway.

Figure 1B:
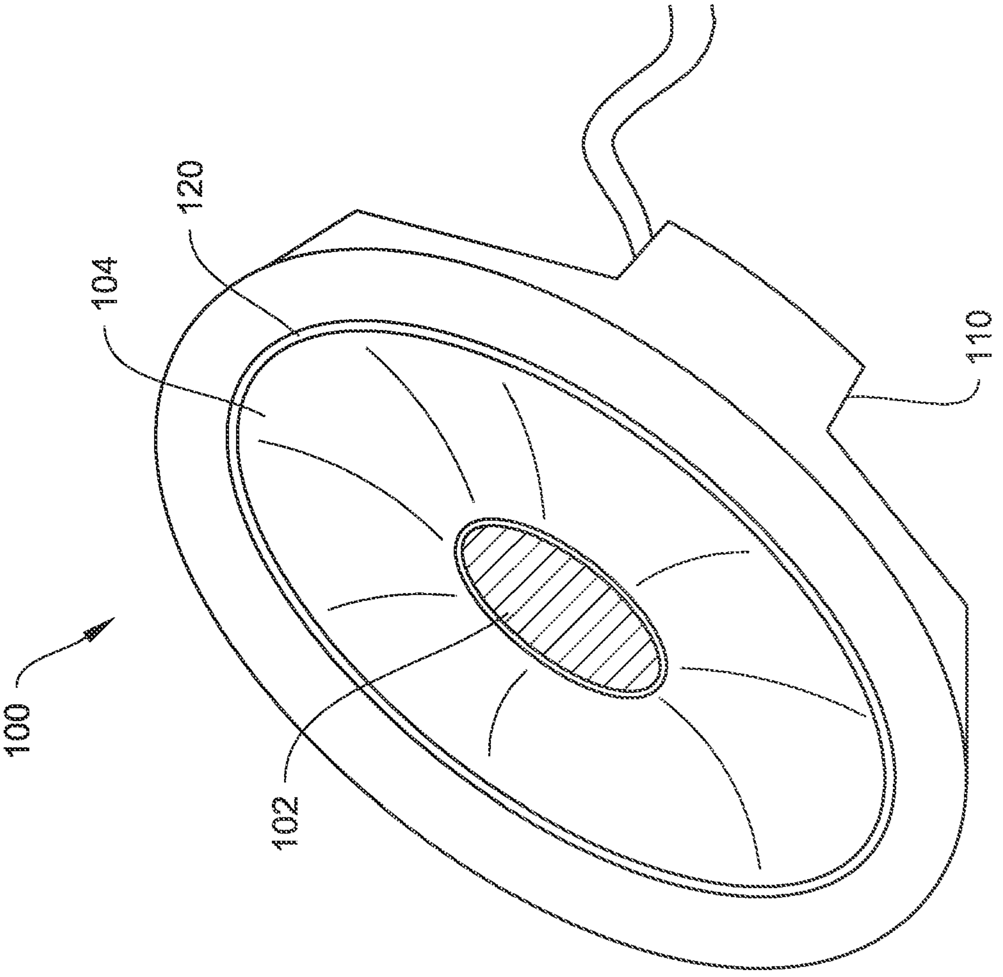
FIGS. 1A and 1B depict side and perspective views of an acousto-haptic transducer, according to an illustrative embodiment of the invention.
Figure 1A:
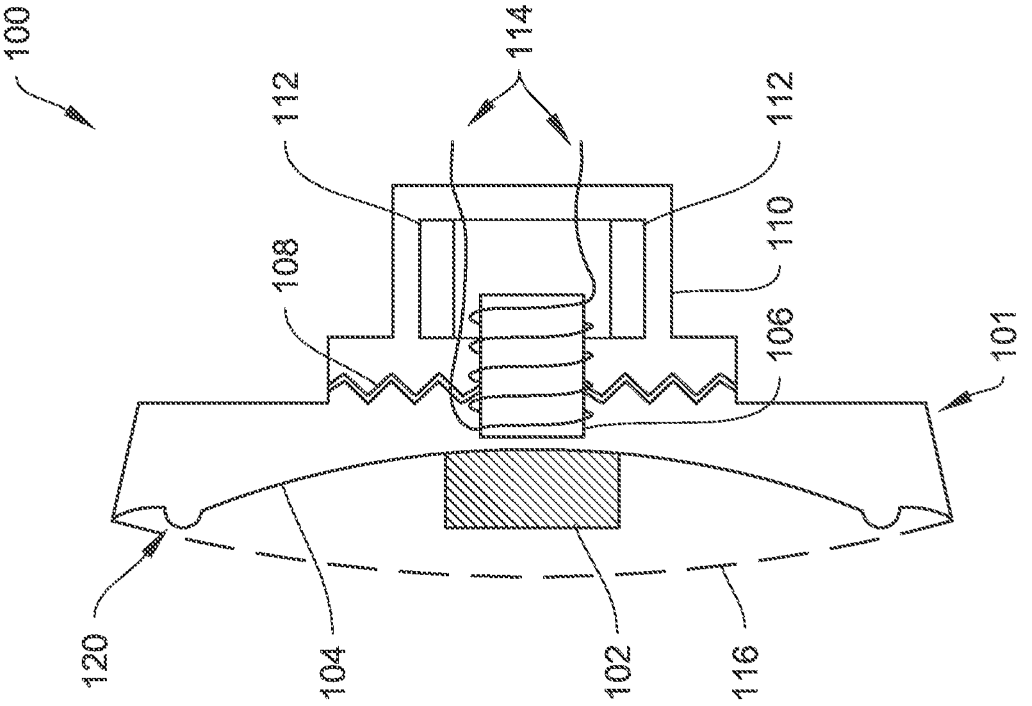

In particular, FIGS. 1A and 1B depict side and perspective views of an acousto-haptic transducer 100, according to an illustrative embodiment of the invention. Transducer 100 includes a mass element 102 coupled to a speaker 101. The speaker 101 may be an acoustic transducer disposed within a housing 110 and includes a voice coil 106 suspended in a magnetic field generated by magnetic assembly 112. The voice coil 106 includes a length of wire wound about a core and capable of generating a magnetic field when electric current is passed through leads 114. The voice coil 106 is attached to the housing 110 by a spider 108. The speaker 101 further includes a diaphragm disposed on the voice coil 106 and configured to couple to the housing 110 via flexible rim 120. The diaphragm 104 is capable of vibrating in response to an electrical signal. The diaphragm 104 can be between 0.5 inches and 4 inches in diameter, with a preferred size dependent on the user's size. A thin cushion (not shown) can overlay the diaphragm 104 and be disposed between the diaphragm 104 and the user to soften the impact of the vibrations on the user. The thin cushion may be made of any suitable material that is sufficiently resilient and can provide padding, such as a silicone gel. An external surface of the diaphragm 104 can be any suitable material that is sufficiently tacky to prevent slippage when the external surface rests against skin or fabrics typically used in clothing. Examples of suitable materials include synthetic rubber, polyurethane, fabric used to cover audio speakers, and foam cushion used to cover headphone speakers. The surface material is typically between 1 mm and 5 mm in thickness. A cushion can encircle the transducer 100 to protect the edge of the diaphragm 104.

During operation, an electrical signal (typically broadband oscillating signals) containing at least one of audio and haptic or tactile information may be transmitted to the voice coil 106 through leads 114. The electrical current flowing through the voice coil 106 creates a Lorentz force between the voice coil 106 solenoid and the magnetic assembly 112. In certain embodiments the magnetic assembly 112 is fixed and attached to the housing 110 and therefore, in response to the Lorentz force, the voice coil 106 may start to oscillate. The spider 108 may damp this oscillation allowing the speaker to have a high fidelity across a full-range of frequencies. The voice coil 106 may serve as an actuator moving the mass element 102 along with the diaphragm. The mass element 102 advantageously allows a user to adjust the resonant frequency of the transducer 100 by varying the mass of the mass element 102. In particular, the transducer may have a resonant frequency range that lies within the range of frequencies of the electrical signal. This resonant frequency range may be moved about the spectrum by adjusting one or more characteristics of the mass element, including its mass. When the voice coil 106 is excited by signals at a frequency in the resonant frequency range, the transducer 100 will vibrate to produce haptic signals. A user can place the transducer 100 in close proximity to skin to perceive tactile sensations generated by these haptic signals.

In certain embodiments, the mass element 102 may be formed from a rigid material having a high density. Alternatively, the mass element 102 may include non-rigid material alone or in combination with rigid material. The non-rigid materials may include, without limitations, silicon. The mass element 102 may be formed from a metal or a metal-alloy. The mass element 102 may be formed from at least one of copper, nickel, silver, gold, manganese, aluminum, and titanium. The mass element 102 may be formed from any suitable rigid material without departing from the scope of the invention. In certain embodiments, the mass element 102 may be formed from a material selected such that the mass, footprint, height, and/or volume of the mass element 102 are suitable for combining with a speaker 101 having a predetermined dimension. In one example, the speaker 101 may be a commercially available speaker having a diaphragm, voice coil and housing with pre-determined dimensions. In such an example, the mass element 102 may need to have a particular dimension and shape, and consequently, the mass element 102 may be formed from a material to provide a mass within the constraints imposed by the pre-determined dimensions of the commercially-available speaker. The mass of the mass element 100 may be about 2 g. In certain embodiments, the mass of the mass element 100 may be from about 0.01 g to about 20 g. In other embodiments, the mass may range from about 1 g to about 4 g. The mass of the mass element may be less than or equal to about 0.1 g, 0.25 g, 0.5 g, 1 g, 1.5 g, 2 g, 2.5 g, 3 g, 3.5 g, 4 g, 4.5 g, 5 g, 10 g, 15 g, or 20 g. In certain embodiments, the mass of the mass element 100 may be selected based on the desired application. For example, for a microspeaker (e.g., microspeakers in mobile devices such as smart phones) having a mass around 1 g-2 g, the mass of the mass element 100 may be selected to be less than 1 g. In certain instances, the mass of the mass element may be selected to be less than 0.1 g.

Generally, as the mass of the mass element 102 increases, the resonant frequency of the transducer decreases. Consequently, the mass of the mass element 102 may be selected to generate haptic signals within particular frequency ranges. In addition to the mass of the mass element 102, the mass of the speaker 101 and housing 110 may be relevant towards the performance of the transducer 100. In particular, the mass of the entire transducer 100 may affect the amplitude of vibrations in the resonant frequency range. Generally, the greater the mass of the transducer 100, the lower the amplitude.

Generally, the mass element 102 may be sized and shaped as suitable for a desired application. The mass element 102 may have a circular cross-section and may be disk-shaped, hemispherical, conical, or frusto-conical. The mass element 102 may have a rectangular cross-section and may be cuboidal, or pyramidal shaped. In one embodiment the mass element 102 has a similar shape and dimensions as that of a U.S. 1 cent coin. In particular, the mass element 102 may be disk-shaped and about 0.75 inches (19.05 mm) in diameter and about 0.061 inches (about 1.55 mm) in thickness. Generally, the shape of the mass element 102 may be selected based on the shape of the underlying diaphragm 104 or voice coil 106 or housing 110. The mass element 102 may be selected such that its footprint (cross section area) is small enough so as not to affect the acoustic characteristics of the diaphragm. Generally, the larger the footprint of the mass element 102, the lower the amplitude of the sound produced by the transducer 100. Therefore, it may be desirable to have a mass element 102 with a footprint small enough so that the diaphragm 104 can produce audible sound. In one embodiment, the ratio between the diaphragm 104 and the cross-section surface area of the mass element 102 may be about four.

In certain embodiments, transducer 100 may include an optional and removable dust cap 116. In such embodiments, the dimensions of the mass element 102 may be selected such that during operation (when the mass element 102 moves towards and away from the cap 116) the mass element 102 does not make contact with the cap 116. In such embodiments, the haptic signals are transmitted to the user through inertial vibration of the housing 110 of the transducer. In certain embodiments, the transducer may be configured to provide an alarm signal to a user when the transducer is malfunctioning or is being incorrectly or inappropriately used. The mass element 102 may be configured to make contact with the cap 116 during operation. In such an embodiment, a user may place the cap 116 in contact with skin and may feel the mass striking the inside of the cap 116 during use. Such haptic signals may be stronger than other signals and consequently may signal an alarm to the user.

The mass element 102 may be disposed near the center region of the diaphragm 104. The mass element may be attached away from the center region on the diaphragm 104. In certain embodiments, transducer 100 includes a plurality of mass elements 102, having the same or different masses sizes and shapes, stacked on top of each other at one or more locations on the diaphragm 104. In one such embodiment, the transducer 100 includes a plurality of mass elements 102 located at a two or more locations on the diaphragm 104. In such an embodiment, the transducer 100 may have more than one adjustable resonant frequency range, and when vibrated at one or more of these frequencies, the transducer 100 may generate haptic signals. In certain embodiments, a plurality of mass elements 102 having different masses, based on their location on the diaphragm 104, may be capable of transverse vibrations in addition to longitudinal vibrations. In such embodiments, a user may selectively control which of the plurality of mass elements 102 to resonate.

In certain embodiments, the mass element 102 may be attached to the diaphragm 104 using an adhesive such as glue. In certain embodiments, the diaphragm 104 may have an opening in the center region. In such embodiments, the mass element 102 may be attached to the voice coil 106 and/or a portion of the diaphragm 104 surrounding the opening. In certain embodiments, the mass element 102 may be permanently attached to the diaphragm 104 and/or voice coil 106. In certain other embodiments, the mass element 102 may be removably attached or removably coupled to the diaphragm 104 and/or voice coil 106. In such embodiments, the mass element 102 may be attached to the diaphragm 104 and/or voice coil 106 by a temporary or removable adhesive. In other embodiments, the mass element 102 may be attached to one or more portions of the housing 110. In such embodiments, the mass element 102 may be attached to an inside or outside portion of the housing. In one embodiment, the mass element includes one or more components associated with the housing 110. For example, if a diaphragm 104 is directly connected to (e.g., glued) to the frame of a housing module, the magnet and/or the frame of the speaker may act as the resonant mass. Thus, various components of a transducer system may be configured, shaped, connected, weighted, and/or arranged in a selected way as to provide a resonant mass for the transducer system.

Figure 2A:
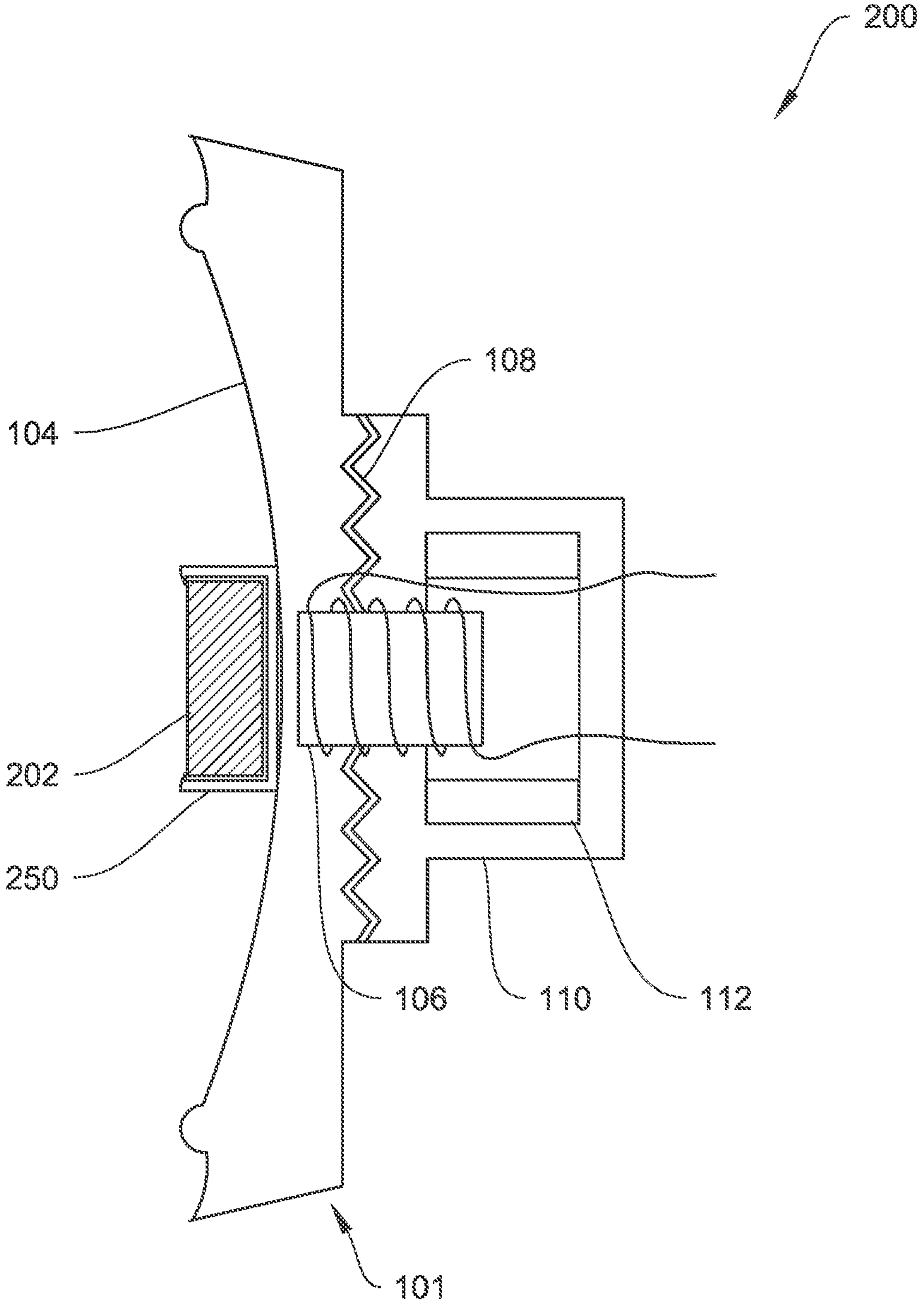
FIG. 2A depicts a side view of an acousto-haptic transducer, according to an illustrative embodiment of the invention.

FIGS. 2A-2F depict various illustrative embodiments of an acousto-haptic transducer as described herein. Features in each of the FIGS. 2A-2F and FIGS. 1A-1B may be combined, modified and substituted in any suitable configuration without departing from the scope of the present disclosure. For example, features shown or described with reference to one or more of FIGS. 1A-2F may be combined with features shown or described with reference to another one or more of FIGS. 1A-2F without departing from the scope of the present disclosure. In certain embodiments, as depicted in FIG. 2A, mass element 102 may be coupled, indirectly, to the diaphragm 104 and/or voice coil 106 via a holder 250. In particular. FIG. 2A depicts a side view of an acousto-haptic transducer 200, according to an illustrative embodiment of the invention. Transducer 200 may be similar to transducer 100 of FIG. 1 in many respects, however, mass element 200 (which may be similar to mass element 100) is removably coupled to the speaker 101 using a holder 250. The mass element 200 may be snapped into the holder 250 to allow the transducer 200 to suitably operate as a haptic transducer. As desired, haptic functionality may be reduced by snapping off mass element 200 from its holder 250. The holder 250 may be formed from any suitable material, and sized and shaped as desired without departing from the scope of the invention. In certain embodiments, the holder 250 may be configured to hold a plurality of mass elements 102.

Transducers 100 and 200 may be configured with a plurality of mass elements 100 or 200. A user may advantageously add or remove one or more mass elements 100 or 200 to adjust and modify the resonant frequency range of the transducer. In certain embodiments, the mass elements 100 or 200 may be stacked on top of each other and attached together by adhesive. In other embodiments, the mass elements 100 or 200 may be stacked together and snapped onto holder 250. Each of the plurality of mass elements 100 or 200 may have the same or different dimensions, shape, density, mass, material and other characteristics.

Generally, the speakers 101 may be any audio producing device. For example, the audio speakers 101 can be any suitable audio device, such as a loudspeaker, tweeter, subwoofer, earphone, headphone, or neckphone, and the like. The speaker 101 and the mass element 102 are enclosed within housing 110. The housing 110 may encase the speaker 101, mass element 102 and/or other processing circuitry, as will be described in more detail below with reference to FIGS. 3-9. The housing 110 may be configured to support user control interfaces such as a button, switch, dial or screen. The housing 110 may be adapted to attach (directly or indirectly) at least by wire leads 114 to any suitable data source of audio or haptic data, such as a portable music device or video game console. In another alternative embodiment, housing can include, an on-board power source, and a wireless receiver, a wireless transceiver, and a wireless transmitter for communicating audio or haptic data.

Figure 2B:
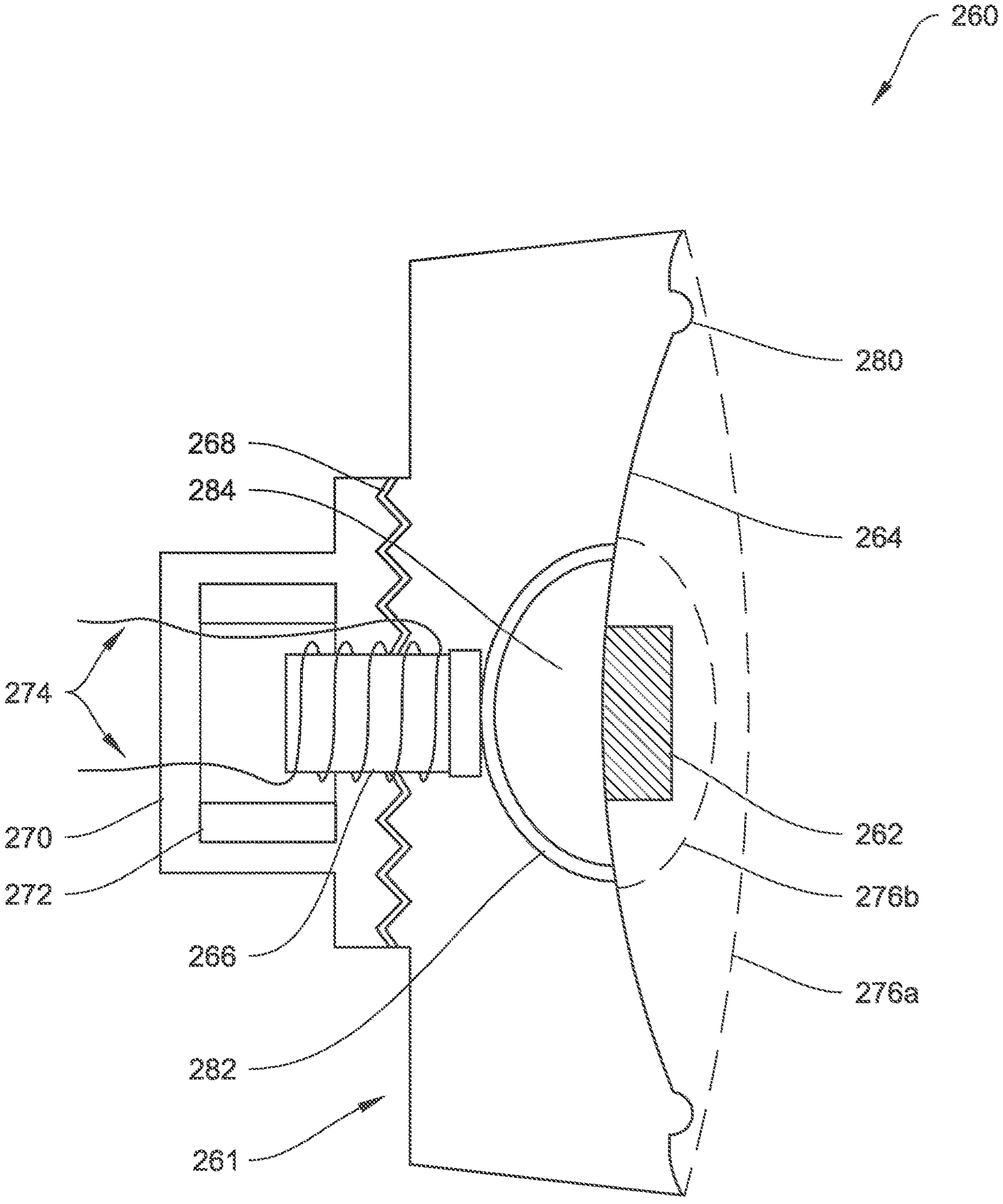
FIGS. 2B and 2C depict a side view of an acousto-haptic transducer having an echo chamber, according to an illustrative embodiment of the invention.
Figure 2C:
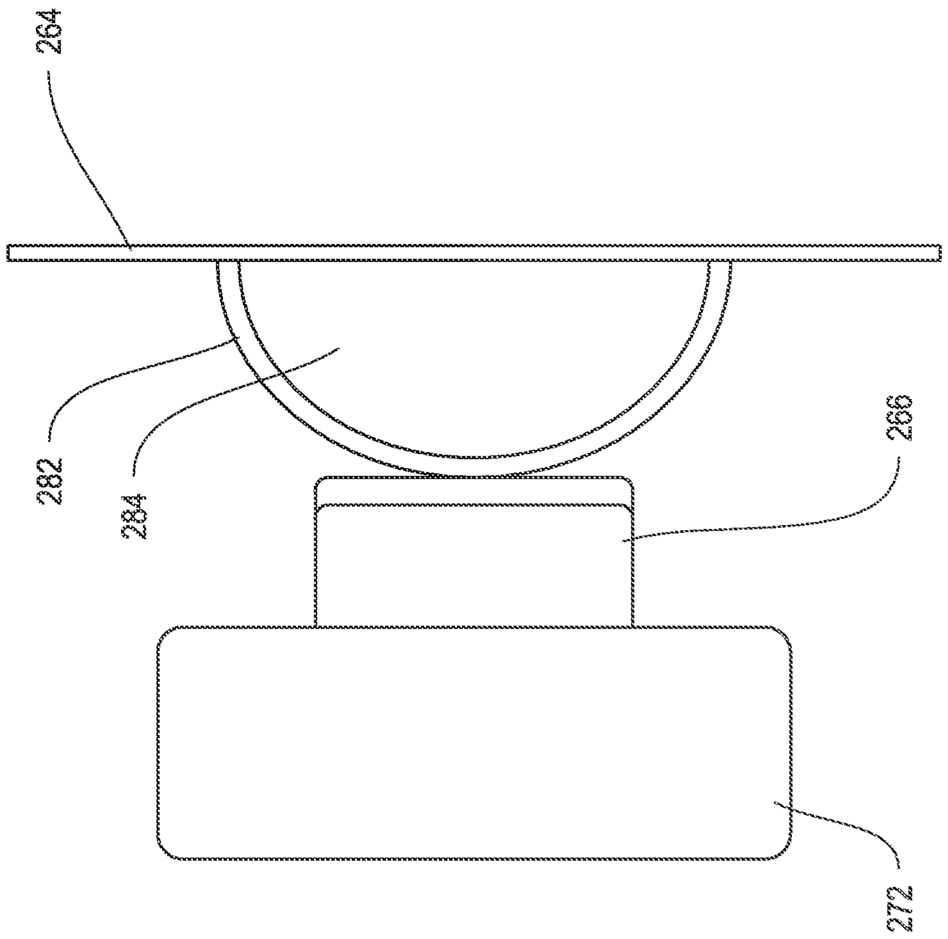

In certain embodiments, to help increase the efficiency and performance, the acousto-haptic transducer described herein may be configured to amplify the output of haptic frequencies. In such embodiments, the acousto-haptic transducer may include one or more echo mediums or echo chambers for generating reverberations or echos and thereby enhance the output of the haptic signal. FIGS. 2B and 2C depict a side view of an acousto-haptic transducer having such an echo chamber, according to an illustrative embodiment of the invention. In particular, transducer 260 includes a mass element 262 coupled to a speaker 261. The speaker 261 may be an acoustic transducer disposed within a housing 270 and includes a voice coil 266 suspended in a magnetic field generated by magnetic assembly 272. The voice coil 266 includes a length of wire wound about a core and capable of generating a magnetic field when electric current is passed through leads 274. The voice coil 266 is attached to the housing 270 by a spider 268. The speaker 261 further includes a diaphragm disposed on the voice coil 266 and configured to couple to the housing 270 via flexible rim 280. The diaphragm 264 is capable of vibrating in response to an electrical signal. The diaphragm 264 can be between 0.5 inches and 4 inches in diameter, with a preferred size dependent on the user's size. A thin cushion (not shown) can overlay the diaphragm 264 and be disposed between the diaphragm 264 and the user to soften the impact of the vibrations on the user. The thin cushion may be made of any suitable material that is sufficiently resilient and can provide padding, such as a silicone gel. An external surface of the diaphragm 264 can be any suitable material that is sufficiently tacky to prevent slippage when the external surface rests against skin or fabrics typically used in clothing. Examples of suitable materials include synthetic rubber, polyurethane, fabric used to cover audio speakers, and foam cushion used to cover headphone speakers. The surface material is typically between 1 mm and 5 mm in thickness. A cushion can encircle the transducer 260 to protect the edge of the diaphragm 264.

As shown in FIG. 2B and in a simplified depiction of transducer 260 in FIG. 2C, the diaphragm 264 may be a substantially rigid surface. The rigid diaphragm 264 may be any suitable material that is substantially rigid, to prevent uncontrolled cone motions, have relatively low mass, to minimize starting force requirements and energy storage issues, and be well damped, to reduce vibrations continuing after the signal has stopped with little or no audible ringing due to its resonance frequency as determined by its usage. In certain embodiments, the substantially rigid diaphragm 264 may be formed from at least one of metal, plastic or a suitable composite material such as composite paper infused with carbon fiber, Kevlar, glass, hemp or bamboo fibers. The substantially rigid diaphragm 264 may be configured in a honeycomb sandwich construction, and may include an additional coating to provide additional stiffening or damping. The diaphragm 264 may have a cone- or dome-shaped profile, and may be any suitable size as desired without departing from the scope of the present disclosure. The substantially rigid diaphragm 264 may be attached to the voice coil 266 through a semi-rigid diaphragm 282.

The semi-rigid diaphragm 282 may be formed from semi-rigid materials including at least one of cellulose fiber (paper), cellulose fiber (paper) with synthetic fibers and binders, and silk. In certain embodiments, the semi-rigid diaphragm 282 may be shaped and positioned such that an echo chamber or echo medium 284 is created between the semi-rigid diaphragm 282 and the rigid diaphragm 264. During operation, in response to electrical signals passing through the voice coil 266, the semi-rigid diaphragm 282 and the rigid diaphragm 264 may vibrate to produce haptic signals. Such haptic signals may reverberate within the echo chamber 284 and thereby amplifying the strength of the output signal. The semi-rigid diaphragm 282 may be shaped, sized and have a suitable curvature as necessary depending on the desired sound characteristics. The size of the echo chamber 284 may be selected as necessary depending on the desired sound characteristics.

In certain embodiments, the echo chamber 284 helps amplifying the output of haptic frequencies because it functions as a low frequency resonator. In certain alternative embodiments, the acousto-haptic transducer described herein may include one or more other low frequency resonating structions, alone or in combination with the echo chamber 284. For example, the acousto-haptic transducer described herein may include one or more springs having a similar natural frequency. These one or more springs may have any suitable shape, including but not limited to, conical, constant pitch, hourglass, variable pitch, and barrel shaped, and these one or more springs may be formed from round or rectangular wire as desired without departing from the scope of the present disclosure. The one or more springs may be formed from any suitable material including at least one of metal and plastic. The acousto-haptic transducer described herein may include any suitable low frequency resonator without departing from the scope of the present disclosure.

Figure 2D:
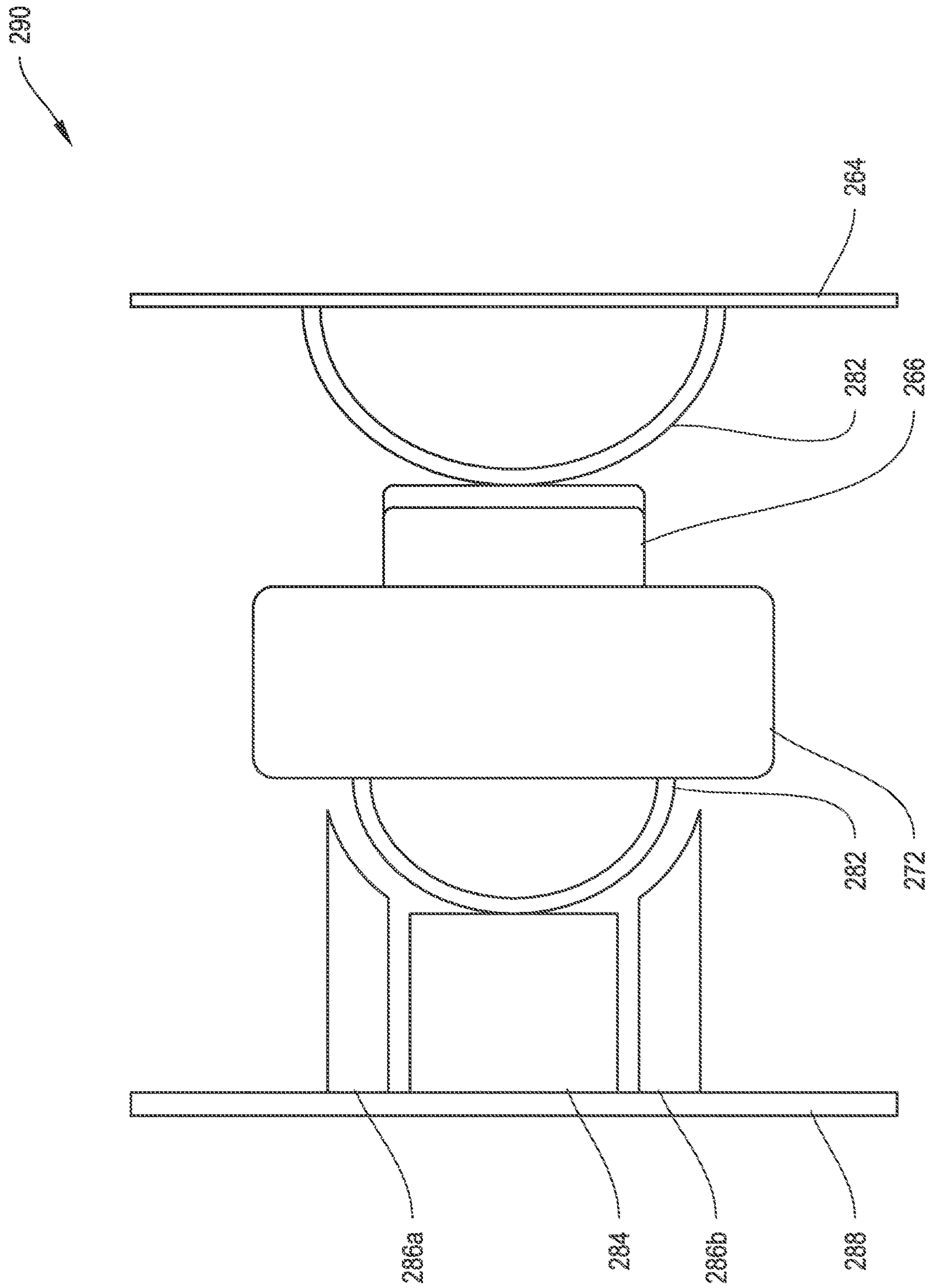
FIG. 2D depicts a side view of an acousto-haptic transducer having an echo chamber and a mechanism to allow for an improved fit to the body of the user, according to an illustrative embodiment of the invention.

In certain embodiments of the systems and methods described herein, it may be desirable to improve the fit of the acousto-haptic transducer to a user. FIG. 2D depicts a simplified side view of an acousto-haptic transducer having an echo chamber and a mechanism to allow for an improved fit to the body of the user, according to an illustrative embodiment of the invention. In particular, transducer 290 of FIG. 2D is similar to transducer 260 of FIGS. 2B and 2C with the addition of an exemplary rotation assembly mechanism to allow for rotation and/or movement of the transducer about a body of a user. Transducer 290 includes a ball and socket mechanism including a ball 282, and a socket assembly 286 (shown in cross section FIG. 2D as partial sockets 286*a* and 286*b*). The ball 282 is attached to the transducer (such as transducer 286) and during operation, the transducer with the ball 282 may rotate freely about and within socket assembly 286. Although, the ball 282 is shown as being attached to the magnet 272 in the simplified FIG. 2D, it should be understood that the ball 282 may be attached to any portion of the transducer including, among others, housing 270 without departing from the scope of the present disclosure.

Generally, the ball and socket mechanism may be formed form any suitable rigid material as desired without departing from the scope of the present disclosure. The ball 282 is depicted as a hemispherical structure, however, the ball 282 may be any suitable portion of a spherical structure or any suitable shape. The socket 286 may be sized and shaped to accommodate the ball 282. In certain embodiments, the rotation assembly including the ball and socket further includes a sponge block 284, which may be formed from foam-like material, disposed within the socket and provides a landing for the ball 282. In particular, the ball 282 may be disposed within the socket 286 such that the ball 282 is in contact with the sponge block 284. The sponge block 284 may allow for the free movement of the ball 282 within the socket 286. The rotation assembly may further include a rigid plane 288 for supporting the ball 282, socket 286 and/or sponge block 284. Generally, the rotation assembly may include any suitable mechanism alone or in combination with the ball and socket mechanism. For example, the rotation assembly may include a gimbal assembly having one, two or three degrees of freedom along one, two or three axes. Any suitable rotation assembly may be included without departing from the scope of the present disclosure.

Figure 2E:
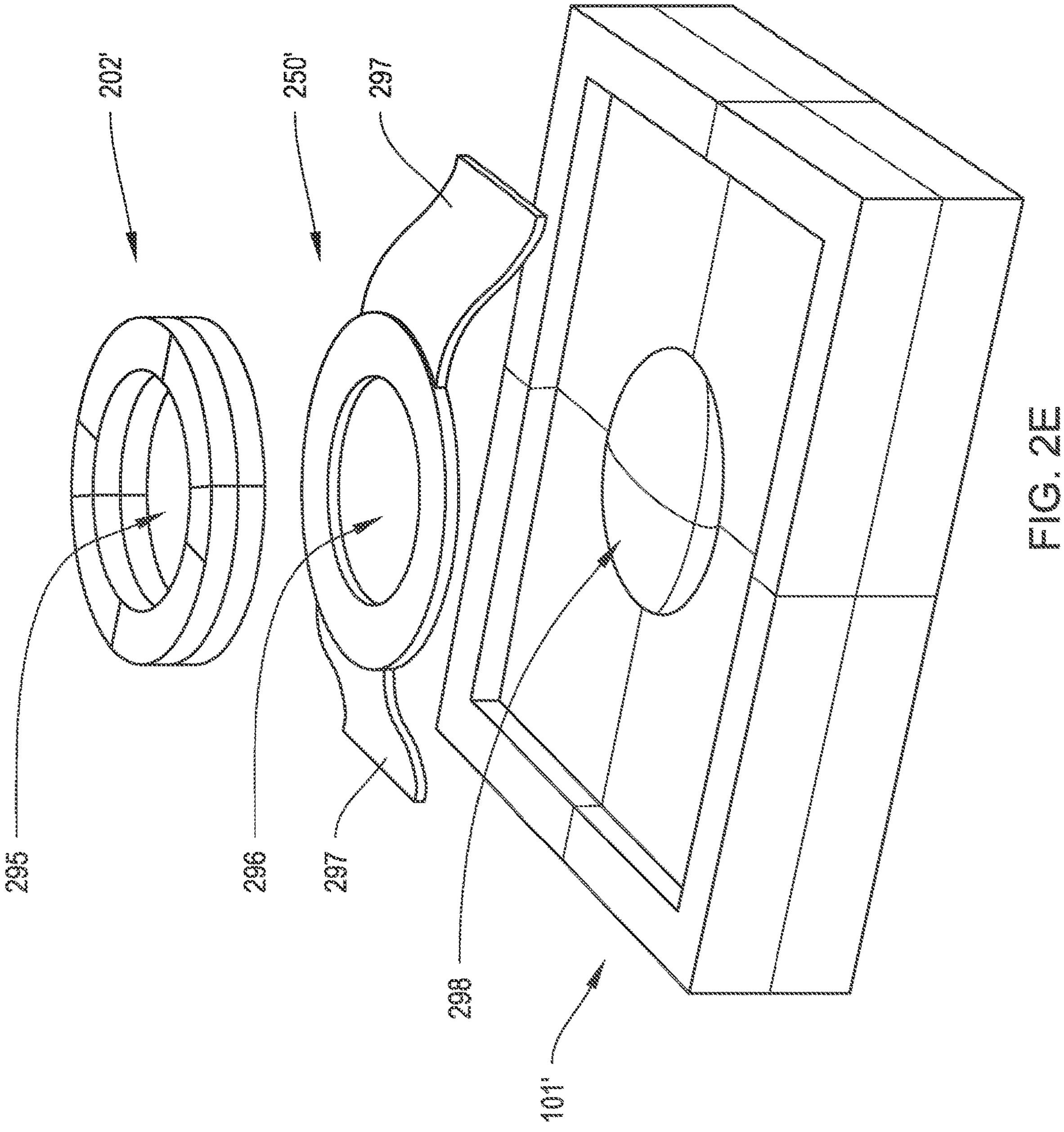
FIGS. 2E and 2F depict perspective views, exploded and assembled, respectively, of an acousto-haptic transducer, according to an illustrative embodiment of the invention.
Figure 2F:
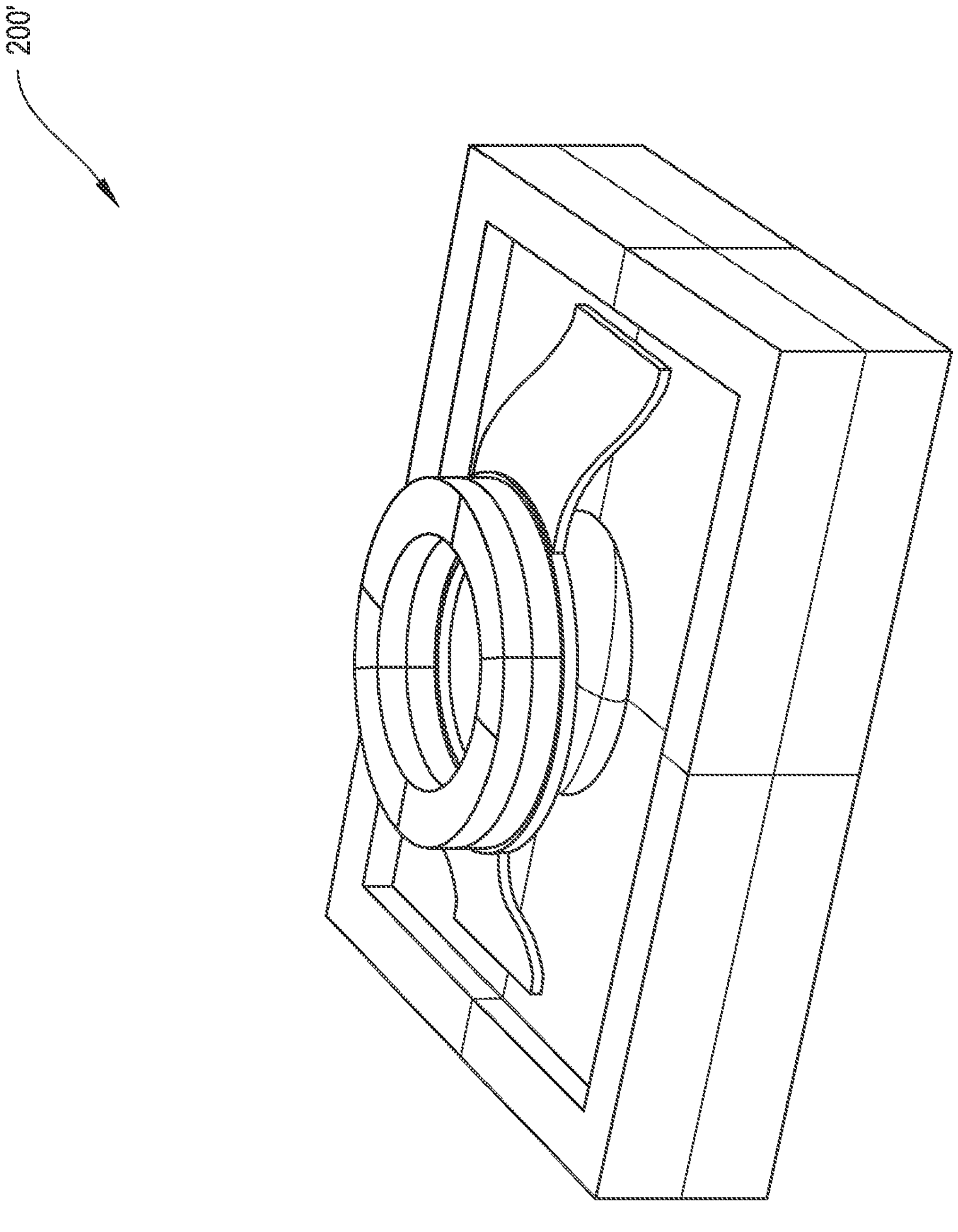

In certain embodiments, the mass element described herein may be coupled indirectly to a portion of the speaker. For example, as was depicted and described herein with reference to FIG. 2A, the mass element may be coupled to a diaphragm and/or voice coil via a holder. Such embodiments may be desirable when, among other times, fitting a commercially available speaker or microspeaker with a mass element to turn the speaker or microspeaker into an acousto-haptic transducer as described herein. When coupled to the speaker, it may be desirable for the mass element to not dampen the audible frequencies of the speaker. FIGS. 2E and 2F depict perspective views, exploded and assembled, respectively, of an acousto-haptic transducer 200' having a mass element sized, shaped and positioned on a speaker to limit dampening of the audible frequencies, according to an illustrative embodiment of the invention. In particular. FIGS. 2E and 2F show a simplified depiction of a speaker 101', which may be similar to speaker 101 of FIGS. 1A and 1B. Speaker 101' may include a commercially available speaker or microspeaker and may include a diaphragm disposed over a voice coil. Transducer 200' includes a mass element 202' and a holder 250'. The mass element 202' and the holder 250' are carefully selected to not dampen, or at least substantially limit dampening the audible frequencies generated by the speaker 101'. Specifically. Applicants have recognized that such dampening can be reduced by limiting or eliminating the contact of the mass element 202' and/or holder 250' with a central region 298 of the speaker 101'. Lower frequencies, generally responsible for the haptic signals generated by transducer 200', may be in the range of about 0 to about 500 Hz. These haptic signals are typically generated by the excursion of the entire or a substantial portion of the diaphragm. Therefore, it may be sufficient to attach the mass element 202' to the periphery of the central region 298 of the speaker 101'.

As depicted in FIGS. 2E and 2F, the mass element 202' is attached to speaker 101' via holder 250'. To minimize the footprint of the mass element 202' and the holder 250' on the central region 298, the holder 250' includes legs 297 that are permanently or removably attached outside of the central region 298. The legs 297 may be attached to the diaphragm in any suitable manner including, among others, by gluing with adhesive. The legs 297 are depicted as having an s-shaped profile to accommodate the mass element 202' and to attach to the diaphragm. The legs 297 may be shaped such that only a portion of the end tip regions of the legs 297 may be attached to the diaphragm of the speaker 101'. To prevent damage to the diaphragm, the tips or ends or edges of the legs 297 may be rounded.

The holder 250' includes a central ring shaped region to accommodate the mass element 202'. The holder 250' may be formed from any suitable material sufficient to support the mass element 202' above the central region 298 during vibration of speaker 101'. In certain embodiments, the holder 250' may be formed from a thin suspension film membrane such as a polyester membrane including, but not limited, to polyethylene terephthalate (PET), biaxially-oriented polyethylene terephthalate (BoPET), polypropylene (PP) and biaxially-oriented polypropylene (BoPP). The holder 250' may be formed from any material having properties similar to those of PET, BoPET, BoPP. PP, without departing from the scope of the present disclosure. The holder 250' may have a thickness similar to or smaller than the thickness of the diaphragm of speaker 101'. In certain embodiments, the thickness of the holder 250' may be larger than the thickness of the diaphragm of speaker 101'. Generally, the holder 250' may be sized and shaped as desired to allow for stable anchoring of the mass element 202' on the diaphragm, while preventing the mass from making contact with the diaphragm of speaker 101' during vibration.

The mass element 202' may be similar to the mass elements described with reference to FIGS. 1A-2D and serves to convert the speaker 101' to an acousto-haptic transducer 200'. As shown in FIGS. 2E-2F, the mass element 202' is a toroidal shaped structure having an opening 295 positioned on top of the holder 250'. The holder 250' also includes an opening 296 substantially concentric with the opening 295 of the mass element 202'. The toroidal shape allows sound to pass through to a user from the central region 298 of the speaker 101'. Thus, the openings 295 and 296 serve to reduce dampening of acoustic signals in the acousto-haptic transducer. The mass element 202' and the opening 295 may be any suitable shape or size without departing from the scope of the present disclosure. Moreover, the mass element 202' and the holder 250' may or may not have the same shape. The mass element 202' may be larger than or smaller than the holder 250', and the opening 295 may be larger than or smaller than the opening 296. In certain embodiments, the opening 296 may not be concentric with the opening 295, and the mass element 202' may be not positioned centrally with reference to holder 250'. In one example (not shown in the figures), the mass element 202' may have a rectangular shape, but the opening 295 may be circular. In certain embodiments, acousto-haptic transducer 200' may have a mass of about 1.107 g, wherein the mass of the mass element 202' may be less than 0.1 g and approximately 0.086 g. In such embodiments, the holder 250' may be formed from BoPET and have a thickness of about 0.04 mm.

As noted earlier, during operation electrical signals from a data source cause the transducer 100, 200, 200' 260 and/or 290 to generate acoustic and haptic signals. In certain embodiments, a controller and/or other processing circuitry may be disposed between the data source and the transducer 100, 200, 200', 260 and/or 290 to enhance the signal.

Figure 3:
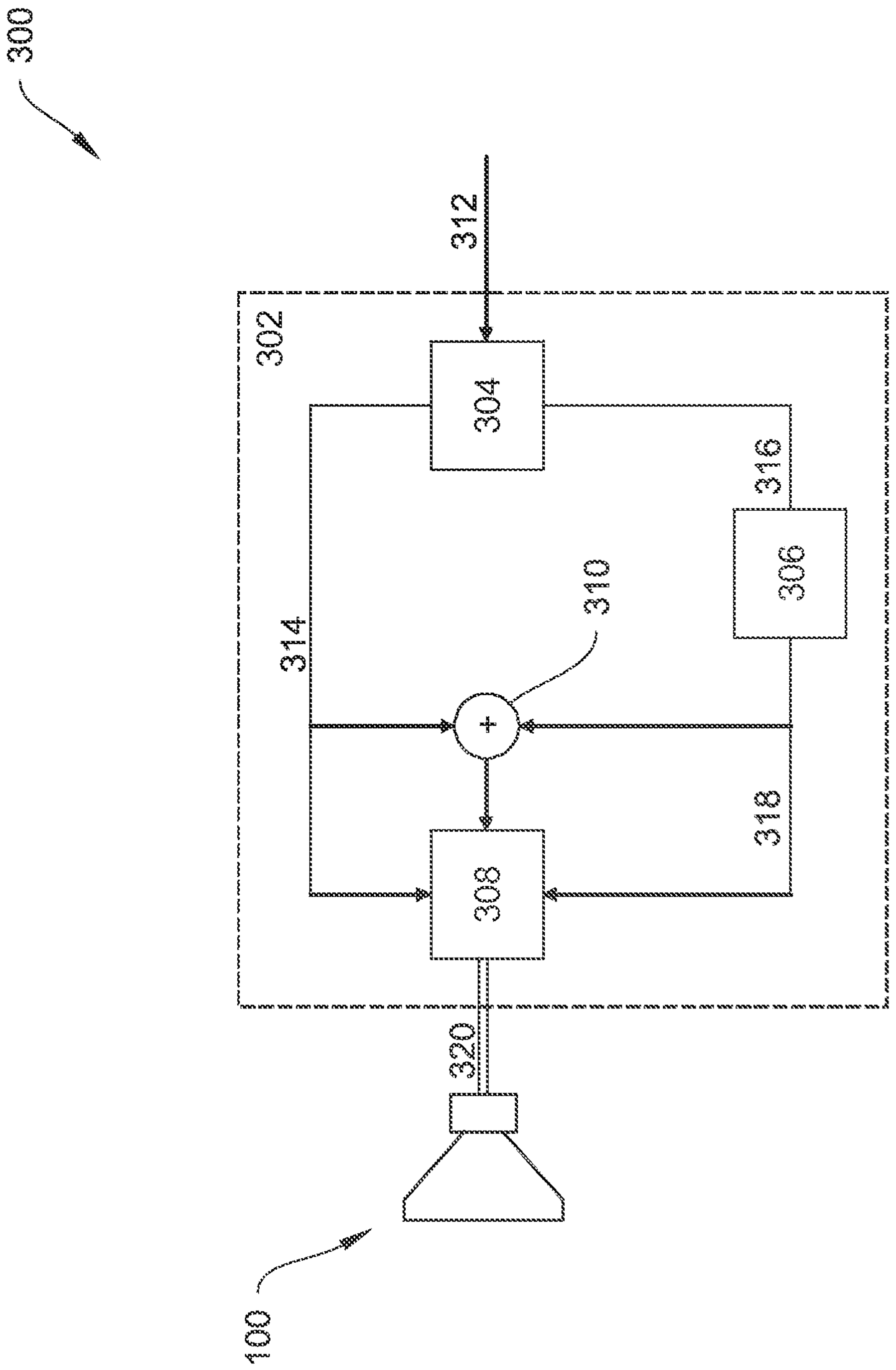
FIG. 3 is a block diagram of an acousto-haptic transducer coupled to a controller, according to an illustrative embodiment of the invention.

FIG. 3 is a block diagram of an acousto-haptic transducer coupled to a controller, according to an illustrative embodiment of the invention. In particular, FIG. 3 shows a system 300 including an acousto-haptic transducer 100, 200,200', 260 or 290 connected to a controller 302. Electrical signals containing audio and/or haptic signals 312 are fed into the controller 302, and specifically into filter 304. Splitter 304 splits the signal 312 into a first portion 314 having a first range of frequencies and a second portion 316 having a second range of frequencies. Often times, haptic information may be contained in the low frequency region of an incoming audio signal 312. The splitter 304 may include a combination of one or more high-pass, low-pass, band-pass filters to split the signal 312 into a high frequency portion corresponding to first portion 314, and a low frequency portion corresponding to second portion 316. The second portion 316 is amplified at amplifier 306 to produce an amplified signal 318. Below is a more detailed description of amplifying or enhancing the low frequency or bass portion of the signal (bass enhancement).

The controller 300 may include a switch 308 for controlling the nature of the signal 320 being sent to the transducer 100,200,200' 260 and/or 290. In certain embodiments, the switch 308 includes a 3-way switch. In such embodiments, in a first mode, the switch 308 may be configured to transmit to the transducer 100 the first portion 314. In a second mode, the switch 308 may be configured to transmit to the transducer 100,200,200' 260 and/or 290 the amplified second portion 318. In a third configuration, the switch 308 in connection with other processing circuitry 310, e.g., a summing circuit, amplifier, transistor, operational amplifier, or like signal combiner, may be configured to transmit a combination of both portions 314 and 318. The switch 308 may be mechanical, electromechanical, micromachined. MEMS-based, integrated circuit (IC) based, hardware and/or software based.

Any of the components 304, 306, or 308 may include a microprocessor for controlling the operation of any of the components 304, 306, or 308. In one embodiment, the microprocessor is included in a separate IC and controls some or all of the components in the controller 302. The microprocessor may include or interface with a memory configured to store instructions of a software program, function, and/or application. A function or application may be configured to control one or more of the components 304, 306, 308, or other components based on the instructions stored in the memory, e.g., a computer readable medium. For example, the application may dynamically control the switching of the switch 308 based on a detected signal 312,314, and/or 316. The application may, for example, control the splitter 306 or filter 304 to set the frequency and/or bandwidth for filtering or splitting. The microprocessor may include a digital signal processor (DSP), running microcode or the like, to perform certain functions. Any of the various illustrative systems disclosed herein may include a microprocessor controller as described above. In some embodiments, any of the signals, at any stage of signal processing, may be converted and processed as digital signals, and then converted to an analog signal for driving the output audio and/or haptic signals.

The switch 308 and processing circuitry 310 arrangement are one example of how signals may be combined and/or separately provided to the speaker 100,200,200' 260 and/or 290 or a driver circuit. Other arrangements may be employed. For example, a set of switches may be used to block or pass any one of the signals to the speaker 100,200, 200', 260 and/or 290. An amplifier may be used to combine the signals 314 and 318 while a switch is enabled or disabled to pass the combined signal to the speaker 100, 200,200', 260 and/or 290 or a driver circuit or other component. Those of ordinary skill will understand that various other arrangements may be employed to effect the combining and/or selection of various signals.

Figure 4:
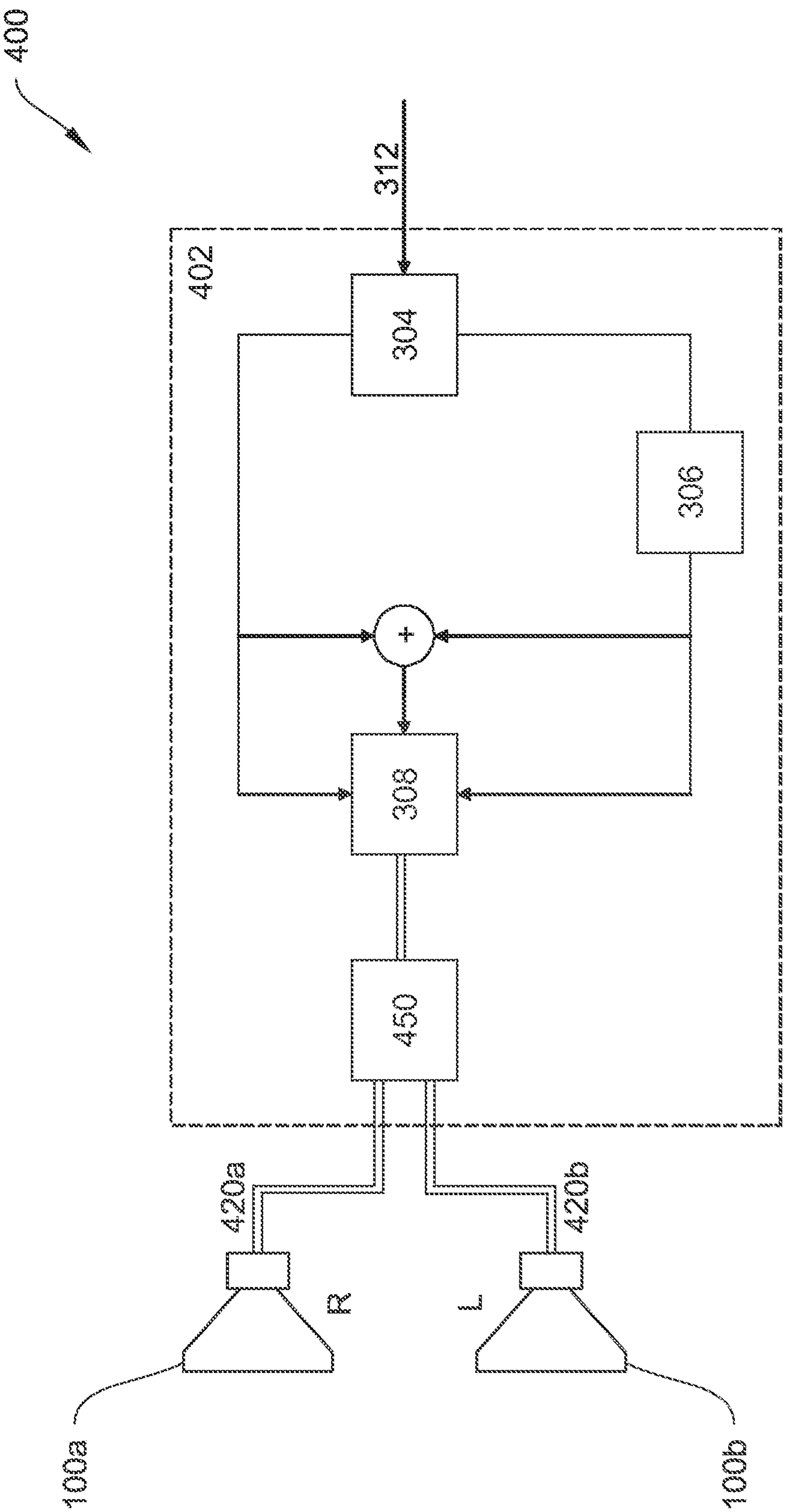
FIG. 4 is a block diagram of two acousto-haptic transducers coupled to a controller, according to an illustrative embodiment of the invention.

In certain embodiments, the incoming electrical audio signal 312 may be a stereo signal configured to be processed and transformed to sound by a plurality of transducers. FIG. 4 is a block diagram of two acousto-haptic transducers coupled to a controller for processing stereo sound and haptics, according to an illustrative embodiment of the invention. In particular, FIG. 4 shows a system 400 including two acousto-haptic transducer 100*a* and 100*b* (each similar to transducers 100, 200, 200' 260 and/or 290) connected to a controller 402. Incoming electrical signals 312 are split into two portions similar to controller 302 of FIG. 3. One portion of the signal 312 corresponding to the haptic portion may be amplified and optionally recombined with the audio portion. Controller 402 further includes processing circuitry 450 for separately driving the left transducer 100*a* and right transducer 100*b*.

Acousto-haptic systems 300 and 400 described above may receive electrical signals containing audio, haptic, and other data from a variety of media and devices. Example media include music, movies, television programs, video games, and virtual reality environments. Example devices that can provide data and be used in conjunction with a vibration device include portable music players, portable video players, portable video game consoles, televisions, computers, and home entertainment systems. Exemplary acousto-haptic systems may connect to exemplary devices via an audio jack coupled to a wire or may contain a wireless receiver for wirelessly receiving signals from a device equipped with a wireless transmitter.

Using an acousto-haptic device in conjunction with a media device can enhance the user's interaction with the media by creating tactile sensations that synchronize with the data being presented by the media device. For example, soundtracks that accompany movies typically have, in addition to music and dialogue, sounds that accompany the action in the movie, such as a door slamming or an explosion. The acousto-haptic device, by transforming these sounds into vibrations, allows the user to simultaneously feel this action in addition to seeing and hearing it, which can create a more immersive experience for the user. This immersive effect can be especially desirable when the visual data is poor, for example portable devices with small video screens or computer monitors with relatively low resolution. As another example, the user's perception of music may be enhanced by the vibration device, which can create a tactile sensation synchronized with the music by using the same data source as the audio speakers. This enhancement can be especially desirable for experiencing the low frequency component, also known as bass.

As noted above the acousto-haptic systems 300 and 400 can include processing circuitry capable of processing electrical signals for enhancing the content perceived by the user or allowing the user to modify the content. Exemplary functions of processing circuitry include selecting acoustic and/or haptic signal portions, pitch control, volume control, fade-in, amplitude-ceiling, auto shut-off, channel separation, phase-delay, and bass enhancement, whose implementations are well-known to one skilled in the art. Pitch control allows a user to increase or decrease the overall frequency of an electrical signal. Volume control allows a user to increase or decrease the overall amplitude of an electrical signal. Fade-in gradually increases the amplitude of the beginning of an electrical signal to lessen the initial impact of vibrations on a user. Amplitude-ceiling creates an upper bound on the magnitude of the amplitude of the electrical signal to prevent the user from experiencing excessively intense vibrations. Auto shut off turns off the processing circuitry to conserve power without receiving input from the user and when an electrical signal has not been received for a preset amount of time. Channel separation separates a stereo or multichannel signal into its component channels. Phase-delay delays a signal sent to a second vibrator with respect to a signal sent to a first transducer to give the user the impression the sound originated from a location closer to the first transducer than the second transducer. Bass enhancement increases the amplitude of the bass component of an electrical audio signal relative to the rest of the signal.

Examples of multichannel signals that can be separated by processing circuitry include stereo sound, surround sound, and multichannel haptic data. Stereo sound typically uses two channels. Channel separation circuitry can separate a stereo sound two-channel electrical audio signal into a left channel signal and a right channel signal intended to be experienced by the user from, respectively, a left-hand side and a right-hand side. Multichannel electrical audio signals, such as those used in 5.1 and 6.1 surround sound, can similarly be separated, and typically contain rear channel signals intended to be experienced by the user from the rear. Channel separation circuitry can also separate multichannel haptic data, such as those used with video games or virtual reality environments, that similarly contain data intended to be experienced by the user from a specific direction.

Multiple implementations of bass enhancement are possible. In one implementation, an electrical signal is received at an input for transmitting to a transducer and/or audio speakers. A low frequency cross-over circuit can filter through only the bass component of the received electrical signal, whose overall amplitude is increased by an amplifier before reaching a transducer.

Another bass enhancement implementation increases the bass component without filtering out the rest of a signal. Processing circuitry can sample a received electrical signal to create a sampled signal, modulate the pitch of the sampled signal to create a modulated sampled signal, and mix the modulated sampled signal with the received electrical signal to create a signal for the transducer. The modulation of the pitch preferably lowers the pitch of the sampled signal to increase the bass component of the signal received by the transducer. The user may also control the degree of bass enhancement by lowering the overall frequency of a signal using pitch control.

Figure 5:
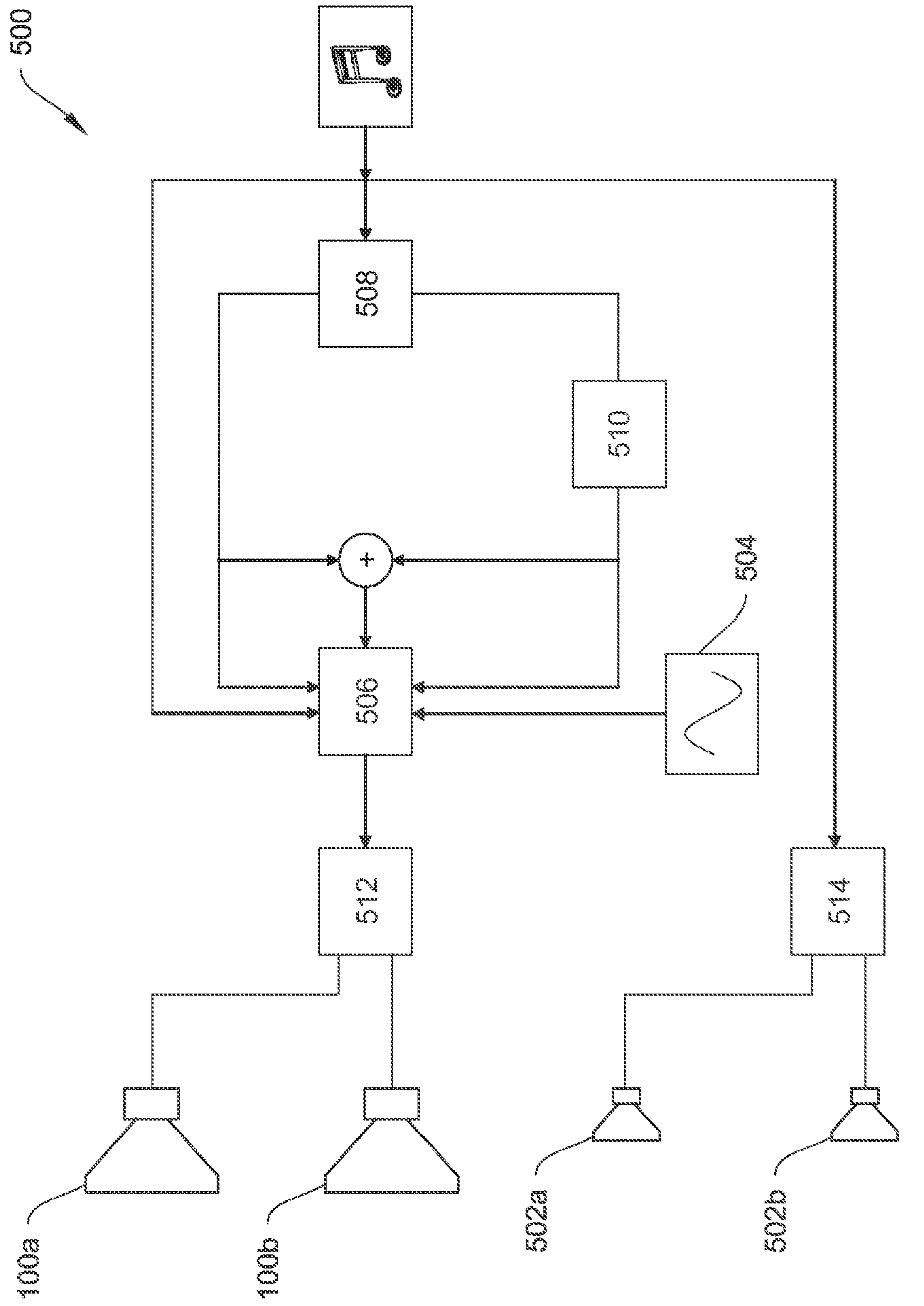
FIG. 5 is a block diagram of two acousto-haptic transducers and two speakers coupled to a controller, according to an illustrative embodiment of the invention.
Figure 6:
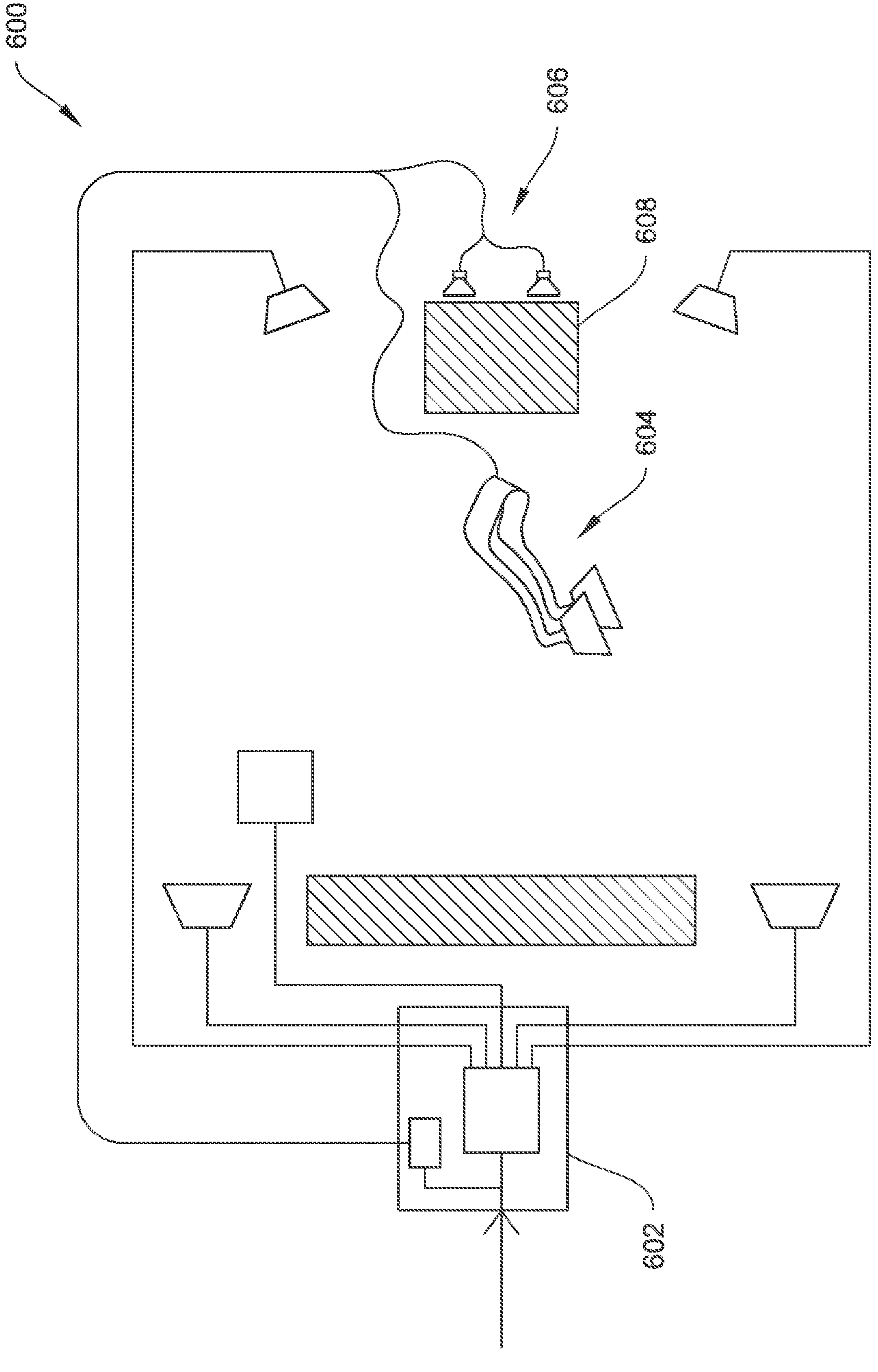
FIG. 6 is a block diagram of acousto-haptic transducers integrated with a surround sound system, according to an illustrative embodiment of the invention.

In certain embodiments, acousto-haptic transducers may be combined with one or more speakers. Two such embodiments are shown in FIGS. 5 and 6. FIG. 5 is a block diagram of two acousto-haptic transducers and two speakers coupled to a controller, according to an illustrative embodiment of the invention. System 500 includes two speakers 502*a* and 502*b* connected to the input electrical signal source. System 500 allows a user to separately enjoy the audio through speakers 502*a* and 502*b*, while experiencing the haptic effects through transducers 100*a* and 100*b*. In certain embodiments, the transducers 100*a* and 100*b* can be driven separately by an electrical signal generator 504, which may be separate from the incoming signal source which contains audio information. The various signals may be switched at switching circuitry 506 and drive the transducers 100*a* and 100*b*. The system 500 may include drivers 512 and 514, and splitter and/or amplifier elements 508 and 510.

Many, if not most homes are equipped with multispeaker systems for generating an immersive surround sound that envelopes a user. Such a system will be further enhanced with the inclusion of one or more acousto-haptic transducers integrated, using suitable processing circuitry, with a conventional surround sound system for a fully-immersive entertainment experience. FIG. 6 is a block diagram of an exemplary acousto-haptic transducers integrated with a surround sound system, according to an illustrative embodiment of the invention. In particular, FIG. 6 shows a surround sound system 600 and acousto-haptic transducers 604 and 606 connected together to a media source. Transducer 604 may be housed in a compact adjustable housing for attaching to a user's body, for example about the shoulder and on the sternum. Transducer 606 may be configured to be positioned in close proximity to a chair or sofa or another piece of furniture that the user is in contact with. Transducers 604 and 606 are connected to the media source through processing circuitry 602. Processing circuitry 602 may be similar to processing circuitry described above with reference to FIGS. 3-5.

In certain embodiments, processing circuitry 602 can send different signals, each based on an electrical signal received from a source of data, to different destinations. The different destinations can include audio speakers and transducers 604 and 606 that are differentiated by their position relative to the body. For example, the electrical signals generated by channel separation can be transmitted to speakers or transducers having appropriate positions relative to the body. In particular, signals intended to be experienced from the left can be sent to speakers or vibrators left of the left-right median plane, signals intended to be experienced from the right can be sent to speakers or transducers right of the left-right median plane, signals intended to be experienced from the rear can be sent to speakers or transducers rear of the front-back coronal plane, and signals intended to be experienced from the front can be sent to speakers or vibrators anterior of the front-back coronal plane. Exemplary systems can include a rear transducers for receiving a rear channel generated by channel separation processing circuitry. Exemplary torso transducers 604, can include a left transducer and a right transducer for receiving, respectively, a left channel and a right channel generated by channel separation processing circuitry. Processing circuitry can also combine multiple functions and can apply different sets of functions to electrical signals depending on their destinations. Preferably, signals sent to transducers have undergone bass enhancement. Different speakers and transducers may also each have individual controllers to allow the user more flexibility in controlling the immersive experience.

As shown in FIG. 6 transducers 606 may be in contact or in close proximity to a piece of furniture such as a couch 608, which in turn may be in direct contact with a user. Similarly, transducers 606 may be positioned in another part of the room that may be in indirect contact with a user. For example, transducer 606 may be positioned in contact with a wall in the room. In such an example, the transducer 606 may be facing the wall or facing away from the wall. In certain embodiments when the transducer 606 is facing away from the wall, acoustic signals can travel from the transducer 606 to the user through the air in between, while the haptic signals may travel through the walls and furniture to the user. Depending on the desired application, the mass of the mass element in transducers 606 may be selected. In certain embodiments, the more indirect the path of the haptic signal from the transducer 606 to the user, the greater the desired mass of the mass element of the transducer 606. In one example, the mass may be selected to be larger than 20 g as desired for providing users with an acousto-haptic effect in large movie theaters.

In the case of a home theater system, for example, the masses in the range of 0.1-20 g would not apply if an indirect method of haptic delivery is used, for example by mounting the acousto-haptic transducer to a wall in the room. Because such range of masses are based on the assumption that the resonant module is in direct contact with the user (i.e. it is used in a cell phone, headphone, or KOR-fx type system). Such devices are low mass enough to allow the small resonant masses mentioned to produce sufficiently strong haptic effects for the user. However, for a home theater system or like larger scale system, then the mass can have a much larger size, even in Kgs (e.g. for movie theater walls).

It will be apparent to those of ordinary skill in the art that certain aspects involved in the operation of the controller 302 may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

The foregoing embodiments are merely examples of various configurations of components of vibration systems described and disclosed herein and are not to be understood as limiting in any way. Additional configurations can be readily deduced from the foregoing, including combinations thereof, and such configurations and continuations are included within the scope of the invention. Variations, modifications, and other implementations of what is described may be employed without departing from the spirit and the scope of the invention. More specifically, any of the method, system and device features described above or incorporated by reference may be combined with any other suitable method, system, or device features disclosed herein or incorporated by reference, and is within the scope of the contemplated inventions.

What is claimed is:

1. A transducer capable of generating acoustic signals and haptic signals, wherein the haptic signals are transmitted to a user through inertial vibrations, the transducer comprising:

- a speaker, including a diaphragm, configured to transform an electrical signal into an acoustic signal;
- a holder attached to a portion of the diaphragm, the holder including an opening positioned above a center region of the diaphragm; and
- a mass element, wherein the mass of the mass element is selected such that a portion of a resonant frequency range of a combination of at least the speaker and the mass element falls within a first range of frequencies, and wherein the opening of the holder is positioned such that at least a portion of the acoustic signal passes from the speaker and the opening.

2. The transducer of claim 1, further comprising an echo chamber formed adjacent to the diaphragm.

3. The transducer of claim 2, wherein the diaphragm is substantially rigid and the speaker further comprises a semi-rigid diaphragm attached to a voice coil and the diaphragm, such that the echo chamber is formed in a region enclosed by the semi-rigid diaphragm and the diaphragm.

4. The transducer of claim 1, wherein the diaphragm is cone-shaped and the semi-rigid diaphragm is substantially hemispherical shaped.

5. The transducer of claim 1, wherein the mass element is removably attached to the holder.

6. The transducer of claim 1, wherein the mass element is glued to a center region of the holder.

7. The transducer of claim 1, wherein the mass element is formed from a rigid material and a mass of the mass element is in a range of about 0.1 g to 20 g.

8. The transducer of claim 1, wherein the mass element is formed from a metal.

9. The transducer of claim 1, wherein the mass element is disk-shaped.

10. The transducer of claim 1, wherein a ratio of a surface area of a top surface of the diaphragm to a surface area of a top surface of the mass element is about 4:1.

11. The transducer of claim 1, wherein the speaker further includes:

a voice coil attached to the diaphragm for receiving the electrical signal and moving the diaphragm in response to the electrical signal; and a spider attached to the voice coil for damping oscillations of the voice coil, the diaphragm, and the mass element.

12. The transducer of claim 1, comprising a plurality of mass elements removably stacked on top of each other.

13. The transducer of claim 1, further comprising a housing having a cap such that the speaker and the mass element are disposed within the housing.

14. The transducer of claim 13, wherein the diaphragm is capable of moving up to a maximum height within the housing, and wherein the mass element has a height selected such that when the diaphragm has moved up to the maximum height, the mass element is within the housing and below the cap.

15. The transducer of claim 1, wherein an opening of the mass element is positioned such that at least the portion of the acoustic signal passes from the speaker and through the opening of the mass element.

16. The transducer of claim 1, wherein the portion of the resonant frequency range has frequency ranges from 2 to 800 Hz.

17. The transducer of claim 1, further comprising a controller connected to the speaker and a source of the electrical signal for splitting the electrical signal and driving the speaker and the mass element with at least one of a signal containing information in audible frequencies and a signal containing information in haptic frequencies.

18. The transducer of claim 17, wherein the signal contains information in the haptic frequencies and the controller is configured to amplify the signal containing information in the haptic frequencies.

19. The transducer of claim 1, wherein the electrical signal has audio information in the first range of frequencies.

20. The transducer of claim 1, wherein the mass element is attached to the holder above the center region of the diaphragm.

* * * * *